Patented Mar. 31, 1953

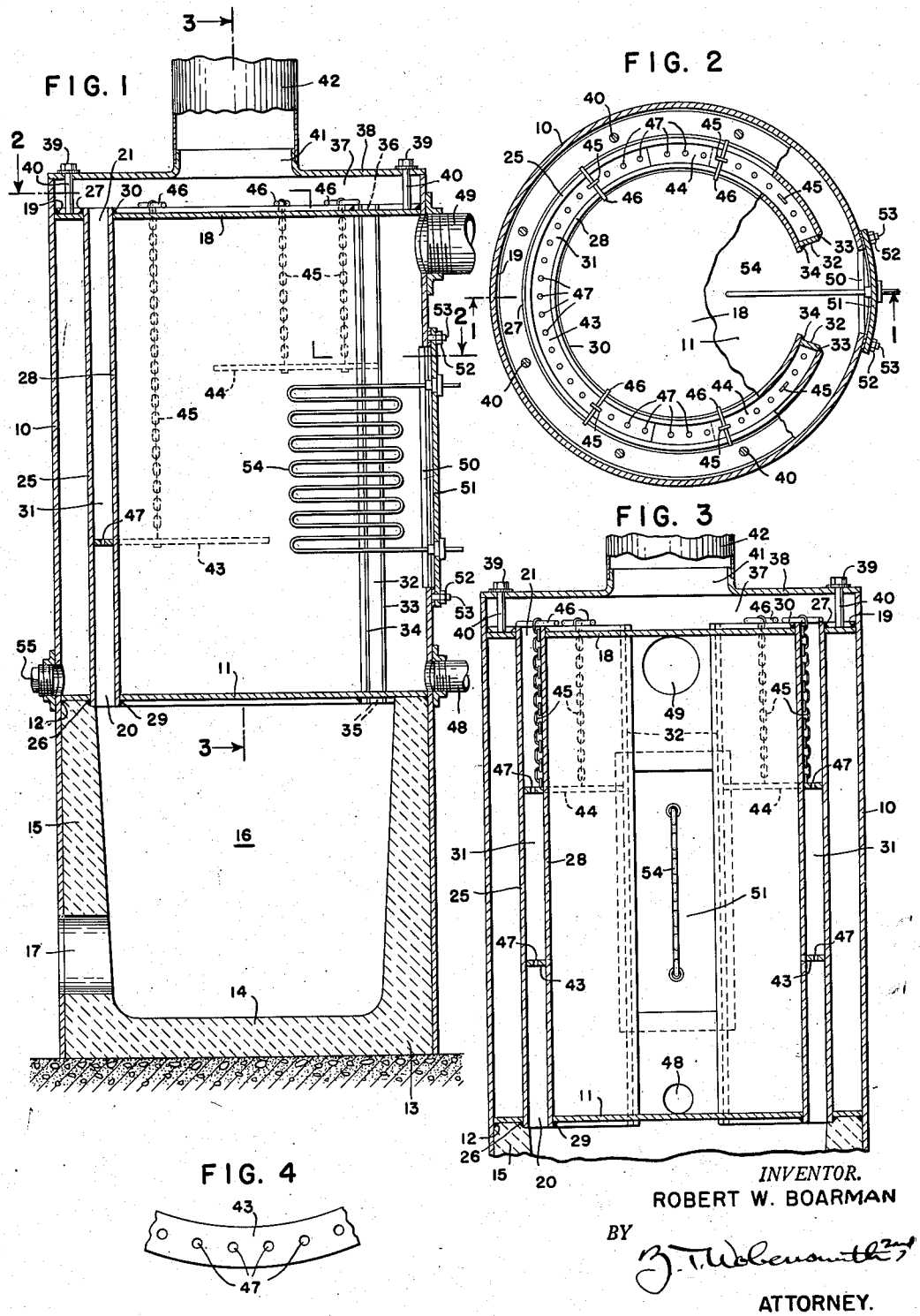

2,633,106

UNITED STATES PATENT OFFICE 2,633,106

DOMESTIC HEATING BOILER

Robert W. Boarman, Pottstown, Pa., assignor to Columbia Boiler Company, Pottstown, Pa., a copartnership Application March 1, 1952, Serial No. 274,357

4 Claims. (Cl. 122—17)

This invention relates to domestic heating boilers.

Various designs have heretofore been proposed for domestic heating boilers. Most of those now available are relatively expensive because of the complexity of the design with attendant high expense of material, fabrication and assembly, or for other reasons.

In accordance with the present invention a domestic heating boiler is provided which is simple in construction, which may be readily fabricated by welding and which is effective for heat transfer.

In accordance with the present invention, also, a welded domestic heating boiler is provided which is particularly adapted for use with fluent fuel, and specifically oil or gas.

In accordance with the present invention, also, a welded domestic heating boiler is provided which requires a minimum amount of material compared with the heat output, which is compact, which may be readily cleaned, and which is of adequate strength and durability.

In accordance with the present invention, also, a welded domestic heating boiler is provided having a simple but effective baffle arrangement.

Other objects and advantageous features of the present invention will be apparent from the specification and claims.

The nature and characteristic feature of the invention will be readily understood from the following description, taken in connection with the accompanying drawings forming part hereof, in which:

Figure 1 is a vertical central sectional view of a domestic heating boiler in accordance with the invention and taken approximately on the line 1—1 of Fig. 2;

Fig. 2 is a horizontal sectional view taken approximately on the line 2—2 of Fig. 1;

Fig. 3 is a vertical sectional view taken approximately on the line 3—3 of Fig. 1; and Fig. 4 is a fragmentary plan view, enlarged, of a portion of one of the baffles.

It should, of course, be understood that the description and drawing herein are illustrative merely, and that various modifications and changes may be made in the structure disclosed without departing from the spirit of the invention.

Referring now more particularly to the drawings, in which a preferred embodiment of the invention is illustrated, an outer cylindrical casing 10 with a suitable insulating covering (not shown) is provided, of sheet steel, with its longitudinal axis vertical, and having, spaced upwardly from the lower edge thereof, a horizontal lower plate 11 of sheet steel.

The plate 11 is preferably welded to the interior wall of the casing 10 by a weld 12 extending along the junction of the plate 11 and the casing 10, and below the plate 11, to provide a strong and fluid tight joint at this location.

In the space between the lower plate 11 and the lower edge of the casing 10, a firebox 13 is provided, open at the top, with a bottom wall 14 and an upwardly extending side wall 15 bounding a combustion chamber 16. Any desired heat resistant material, such as preformed or molded ceramic or fire brick composition, may be employed for the firebox 13.

The side wall 14 and the casing 10 are provided with a burner opening 17 for the reception of a fuel burner (not shown) of the desired type and in accordance with the specific fuel employed.

Spaced upwardly from the horizontal plate 11 and below the upper edge of the casing 10, an upper horizontal plate 18, of sheet steel is provided.

The plate 18 is preferably welded to the interior wall of the casing 10 by a weld 19 extending along the junction of the plate 18 and the casing 10, and above the plate 18, to provide a strong and fluid tight joint at this location.

The lower plate 11 is provided with an arcuate slot 20, the curved edges of which are preferably concentric, with their centers in the vertical longitudinal axis of the casing 10, and the straight end edges of which are preferably radial.

The upper plate 18 is provided with a slot 21 of the same size, shape and comparable location as the slot 20. It will be noted that the burner opening 17 is at the opposite side of the casing 10, although on a lower level, from that at which the straight end edges of the slots 20 and 21 are located.

Extending between and beyond the lower and upper plates 11 and 18, an outer arcuate sheet steel plate 25 is provided, joined at its junction with the lower plate 11 along the outer margin of the slot 19 by a weld 26 extending along the junction, and joined at its junction with the upper plate 18 along the outer margin of the slot 20 by a weld 27 extending along the latter junction. The welds 26 and 27 provide strong and fluid tight joints at their respective locations.

Extending between and beyond the lower and upper plates 11 and 18, also, an inner arcuate sheet steel plate 28 is provided, joined at its junction with the lower plate 11 along the inner margin of the slot 19 by a weld 29 extending along the junction and joined at its junction with the upper plate 18 along the inner margin of the slot 20 by a weld 30 extending along the latter junction. The welds 29 and 30 provide strong and fluid tight joints at their respective locations.

Extending between and beyond the lower and upper plates 11 and 18, also, and meeting the vertical ends of the outer and inner arcuate sheets 25 and 28, flat vertical end plates 32 are provided, of sheet steel. The plates 32 are respectively joined to the sheets 25 and 28 at the ends of the slots 19 and 20 by welds 33 and 34 extending along their respective junctions, and are welded to the lower and upper plates 11 and 18 by welds 35 and 36. The welds 33, 34, 35 and 36 provide strong and fluid tight joints at their respective locations.

It will be noted that the space between the arcuate sheets 25 and 28 and bounded by the end plates 32 provides a gas passageway 31 for gases from the combustion chamber 16 to a space 37, above the upper plate 11. A top closure 38 is provided and is held in place, and in engagement with the upper edge of the casing 10, by nuts 39 on studs 40. The studs 40 can be welded to the top face of the plate 11.

The closure 38 is preferably provided with a collar or flange 41 for the reception of a smoke pipe 42 for connection to the stack (not shown).

Interposed between the top and the bottom of the gas passageway 31, baffles are provided. While any suitable form of baffling may be employed it is preferred to use arcuate strips of two kinds, one, which may be referred to as the longer being shown at 43, and the other which may be referred to as the shorter being shown at 44. The strip 43, as will be seen in Fig. 4, is horizontally disposed and extends around an arc greater than 180° and is located approximately at the lower third point in the passageway 31 between the lower and upper plates 11 and 18, and extends around in the gas passageway 31 in each direction from above the burner opening 17. The other strips 44, are also horizontally disposed and extend from the walls 32 through an arc of approximately 90°, are located approximately at the upper third point in the passageway 31 between the lower and upper plates 11 and 18, and accordingly are disposed so that their ends overlap the ends of the baffle strip 43 although in different horizontal planes.

The baffle strips 43 and 44 are removably supported in the gas passageway 31 in any desired manner and for this purpose chains 45 of the desired length and carried on straddle bars 46 are preferably employed.

It has been determined in practice that for a gas passageway of the order of one inch across, and of the order of 24 inches high, the heat absorption and gas flow are most effective if the baffles are provided with a plurality of holes or perforations 47. Such holes may be varied in size, but ¼ inch drilled holes spaced about three quarters of an inch or an inch apart are satisfactory.

It will be noted that the water space of the boiler, between the lower and upper plates 11 and 18 includes an outer space between the outer arcuate sheet 25 and the casing 10 and an inner space within the inner arcuate sheet 28, with a connection for the inner and outer spaces between the ends of the plates 32.

At any desired location on the casing 10, but preferably in alinement with the connecting water space between the plates 32, a cold water inlet connection 48 and a hot water outlet connection 49 are provided.

Alined with the connecting water space between the plate 32, also, an access opening 50 is provided, and closed by an arcuate access plate 51 which is secured to the casing 10 in any desired manner, such as by nuts 52 on studs 53. The access plate 51 permits of access to the interior of the water space for cleaning, may also be provided with an immersion type water heating coil 54 for supplying hot water for domestic consumption, and if desired may carry immersion type temperature responsive control units (not shown).

Clean out or drain plugs 55 are also provided in the wall of the casing 10 just above the lower plate 11.

The mode of operation should be clear from the foregoing, but will be summarized briefly.

The hot gases of combustion supplied by the burning in the combustion chamber 16 of fuel, introduced by the burner (not shown) in the burner opening 17, pass upwardly in the combustion chamber 16 where they enter the gas passageway 31 and move upwardly around and partially through the baffle plates 43 and 44 and in heat exchange relative to the plates 25, 28 and 32.

The heat of the combustion in the combustion chamber 16 is also effective on the lower plate 11.

The gases of combustion, upon the completion of their upward movement in the gas passageway 31, move into the gas space 37 for discharge through the smoke pipe 42. The hot gases are also in heat exchange relation to the upper plate 18.

The water to be heated enters through the inlet pipe 48 to the interior water spaces heretofore referred to and is available at the delivery pipe 49.

It will be noted that the interior spaces, both for water and hot gases, are readily accessible for inspection and for cleaning if desired.

I claim:

1. A domestic heating boiler comprising a vertical cylindrical casing, upper and lower plates secured at their peripheries to said casing at spaced locations in fluid tight relation, spaced arcuate plates extending vertically between and beyond said upper and lower plates and having their ends arcuately spaced, the arcuate space between said plates being open below and above said lower and upper plates to provide a gas passageway for hot gases of combustion, and a plurality of arcuate perforated baffle plates horizontally disposed in suspended relation in the space between said arcuate plates at different levels.

2. A domestic heating boiler comprising a vertical cylindrical casing, upper and lower plates secured at their peripheries to said casing at spaced locations in fluid tight relation, spaced concentric arcuate plates extending vertically between and beyond said upper and lower plates and having their ends spaced, vertical members for connecting the ends of said arcuate plates extending beyond said upper and lower plates, the portions of said arcuate plates and vertical members providing exposed sections for securing to said upper and lower plates, the arcuate space between said plates and said members being open below and above said lower and upper plates to provide a gas passageway for hot gases of combustion, and arcuate perforated baffle plates horizontally disposed in the space between said arcuate plates at different levels, the baffle plates at one level extending in said space from said vertical members, and the baffle plate at another level spanning an intermediate portion of said arcuate space.

3. A domestic heating boiler comprising a vertical cylindrical casing, an upper horizontal plate spaced downwardly from the upper end of said casing and secured at its periphery to said casing in fluid tight relation, a lower horizontal plate intermediate the top and bottom ends of said casing and secured at its periphery to said casing in fluid tight relation, the space below said lower horizontal plate having a firebox therein open at the top and in communication with the lower face of said lower plate, each of said horizontal plates having alined arcuate slots concentric with the vertical axis of the casing, spaced arcuate plates extending between and beyond said horizontal plates and secured thereto at the margins of said slots and exteriorly to said horizontal plates in fluid tight relation and providing therebetween an arcuate gas passageway in communication at the bottom with the firebox and at the top with the space above the upper horizontal plate and providing water spaces in the interior of said casing, and a plurality of perforated arcuate baffle plates disposed in suspended relation intermediate the top and bottom of said arcuate passageway at different levels.

4. A domestic heating boiler comprising a vertical cylindrical casing, an upper horizontal plate spaced downwardly from the upper end of said casing and secured at its periphery to said casing in fluid tight relation, a lower horizontal plate intermediate the top and bottom ends of said casing and secured at its periphery to said casing in fluid tight relation, the space below said lower horizontal plate having a firebox therein open at the top and in communication with the lower face of said lower plate, each of said horizontal plates having alined arcuate slots concentric with the vertical axis of the casing, spaced arcuate plates extending between and beyond said horizontal plates and secured thereto exteriorly thereof at the margins of said slots in fluid tight relation, a connecting plate member connected to said arcuate plates and to said horizontal plates in fluid tight relation providing with and between said arcuate plates an arcuate gas passageway in communication at the bottom with the firebox and at the top with the space above the upper horizontal plate and providing water spaces in the interior of said casing, pendant members supported at the upper end of said arcuate gas passageway, a perforated arcuate baffle plate carried by said pendant members and horizontally disposed intermediate the top and bottom of said arcuate passageway at one level and spanning a portion of the arcuate passageway, and perforated arcuate baffle plates carried by said pendant members and horizontally disposed intermediate the top and bottom of said arcuate passageway at another level and spanning different portions of said arcuate passageway and in overlapping relation to the ends of said first mentioned baffle plate.

ROBERT W. BOARMAN.

REFERENCES CITED

The following references are of record in the file of this patent:

UNITED STATES PATENTS

| Number | Name | Date |
|---|---|---|
| 1,417,888 | Dearing | May 30, 1922 |
| 1,697,015 | Majuga | Jan. 1, 1929 |
| 2,210,830 | Bernhard | Aug. 6, 1940 |